(12) United States Patent
Takahashi et al.

(10) Patent No.: US 10,301,487 B2
(45) Date of Patent: May 28, 2019

(54) INKJET RECORDING DEVICE, CLEANING METHOD, AND SET OF INK AND CLEANING LIQUID

(71) Applicants: Hiroaki Takahashi, Kanagawa (JP); Michihiko Namba, Kanagawa (JP); Masahiro Kido, Kanagawa (JP); Yuta Nakamura, Kanagawa (JP); Naoto Shimura, Tokyo (JP); Akiko Bannai, Kanagawa (JP); Shizuka Kohzuki, Kanagawa (JP)

(72) Inventors: Hiroaki Takahashi, Kanagawa (JP); Michihiko Namba, Kanagawa (JP); Masahiro Kido, Kanagawa (JP); Yuta Nakamura, Kanagawa (JP); Naoto Shimura, Tokyo (JP); Akiko Bannai, Kanagawa (JP); Shizuka Kohzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/874,948

(22) Filed: Jan. 19, 2018

(65) Prior Publication Data
US 2018/0208783 A1    Jul. 26, 2018

(30) Foreign Application Priority Data

Jan. 25, 2017  (JP) .................... 2017-011247
Nov. 28, 2017  (JP) .................... 2017-227926

(51) Int. Cl.
*C09D 9/04*      (2006.01)
*B41J 2/165*     (2006.01)
(Continued)

(52) U.S. Cl.
CPC ............ *C09D 9/04* (2013.01); *B41J 2/16535* (2013.01); *B41J 2/16552* (2013.01);
(Continued)

(58) Field of Classification Search
CPC ........ C09D 9/04; C09D 11/38; C09D 11/322; C09D 11/54; C09D 11/102; B41J 2/1752;
(Continued)

(56) References Cited

U.S. PATENT DOCUMENTS

| | | | |
|---|---|---|---|
| 8,888,269 B2* | 11/2014 | Yokohama | C09D 11/037 347/100 |
| 2013/0194345 A1* | 8/2013 | Tamai | C11D 7/3263 347/22 |

(Continued)

FOREIGN PATENT DOCUMENTS

| | | |
|---|---|---|
| EP | 2 682 269 A1 | 1/2014 |
| JP | 2008-274016 | 11/2008 |

OTHER PUBLICATIONS

Chemspider, 3-methoxy-N, N-dimethylpropionamide, retrieved on Sep. 29, 2018, the entire document (Year: 2015).*

(Continued)

*Primary Examiner* — Lisa Solomon
(74) *Attorney, Agent, or Firm* — Oblon, McClelland, Maier & Neustadt, L.L.P.

(57) ABSTRACT

An inkjet recording device includes an ink, a discharging head to discharge the ink to a recording medium, and a cleaning liquid, wherein the ink comprises water, a urethane resin having a glass transition temperature of 0 degrees C. or lower, a pigment, a compound represented by the following Chemical formula 1, and a surfactant, wherein the cleaning liquid comprises water, a compound represented by the following Chemical formula 1, a glycol ether compound, and a surfactant, (Continued)

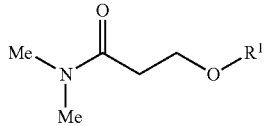

Chemical formula 1 where Me represents a methyl group, $R^1$ represents an alkyl group having 1 to 4 carbon atoms.

11 Claims, 2 Drawing Sheets

(51) Int. Cl.
　　*B41J 29/17*　　　(2006.01)
　　*C09D 11/102*　　(2014.01)
　　*C09D 11/322*　　(2014.01)
　　*C09D 11/38*　　　(2014.01)
　　*C09D 11/54*　　　(2014.01)
　　*B41J 2/175*　　　(2006.01)
(52) U.S. Cl.
　　CPC ............. *B41J 2/1752* (2013.01); *B41J 29/17* (2013.01); *C09D 11/102* (2013.01); *C09D 11/322* (2013.01); *C09D 11/38* (2013.01); *C09D 11/54* (2013.01); *B41J 2002/1655* (2013.01); *B41J 2002/16558* (2013.01)
(58) Field of Classification Search
　　CPC .... B41J 29/17; B41J 2/16535; B41J 2/16552; B41J 2002/16558
　　See application file for complete search history.

(56) References Cited

U.S. PATENT DOCUMENTS

| | | |
|---|---|---|
| 2014/0085376 A1 | 3/2014 | Kato et al. |
| 2017/0015102 A1 | 1/2017 | Nagashima et al. |
| 2017/0183528 A1 | 6/2017 | Kohzuki et al. |
| 2017/0267879 A1 | 9/2017 | Kohzuki et al. |

OTHER PUBLICATIONS

Derwent: WO 2012117742, "Washing Method of Recording Head During Image Forming Method,", Sep. 7, 2012, Basic-Abstract:Novelty (Year: 2012).*

Extended European Search Report dated Mar. 12, 2018 in European Patent Application No. 18152351.5 citing documents AA-AB, AO and AX therein, 9 pages.

"SUPERFLEX Water-dispersed polyurethanes", DKS Co. Ltd. Obtained Mar. 12, 2018, 11 pages.

* cited by examiner

INKJET RECORDING DEVICE, CLEANING METHOD, AND SET OF INK AND CLEANING LIQUID

CROSS-REFERENCE TO RELATED APPLICATIONS

This patent application is based on and claims priority pursuant to 35 U.S.C. § 119 to Japanese Patent Application Nos. 2017-011247 and 2017-227926, filed on Jan. 25, 2017, and Nov. 28, 2017, respectively, in the Japan Patent Office, the entire disclosures of which are hereby incorporated by reference herein.

BACKGROUND

Technical Field

The present invention relates to an inkjet recording device, a cleaning method, and a set of ink and cleaning liquid.

Description of the Related Art

When it comes to inkjet ink, dye ink is popular in terms of demonstration of coloring and reliability. However, for high performance continuous printers and commercial printers, pigmented ink is used frequently due to its excellent water resistance and light fastness. For commercial printing, image quality of typical offset printing is demanded even for coated paper having poor ink absorbability. To secure high speed drying property (high speed fixability) and fixability on substrates having poor ink absorption required for high performance continuous printers, ink that contains a resin having a film-forming property is used. However, the resin having a film-forming property firmly adheres to a discharging head of a recording device, so that it is difficult to sufficiently rinse the resin attached to the discharging head with a cleaning liquid. Ink discharging reliability is lost in such a case.

SUMMARY

According to the present invention, provided is an improved inkjet recording device which includes an ink, a discharging head to discharge the ink to a recording medium, and a cleaning liquid, wherein the ink comprises water, a urethane resin having a glass transition temperature of 0 degrees C. or lower, a pigment, a compound represented by the following Chemical formula 1, and a surfactant, wherein the cleaning liquid comprises water, a compound represented by the following Chemical formula 1, a glycol ether compound, and a surfactant,

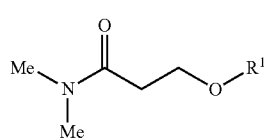

Chemical formula 1 where Me represents a methyl group, $R^1$ represents an alkyl group having 1 to 4 carbon atoms.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
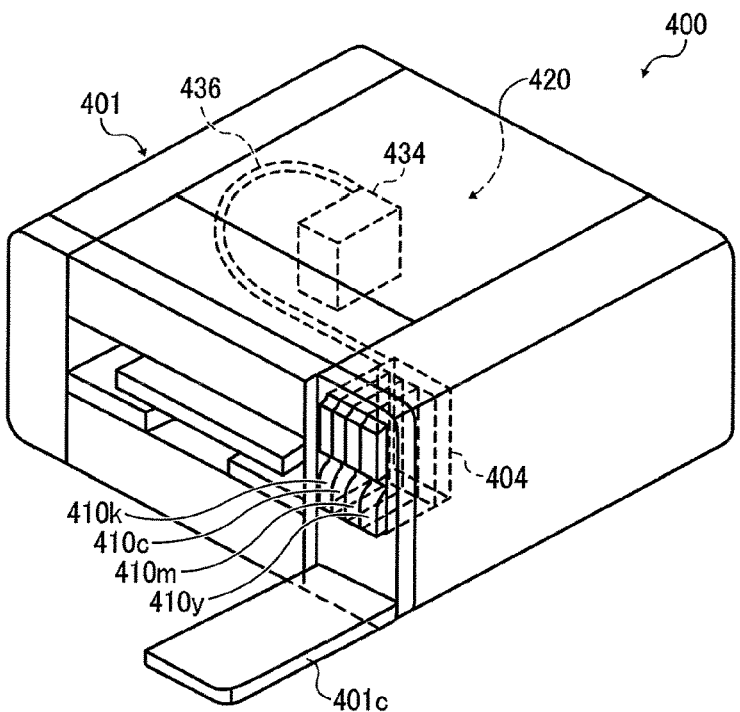
FIG. 1 is a diagram illustrating a perspective view illustrating an example of a serial type image forming apparatus.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc. in the present disclosure represent the same meaning, unless otherwise specified.

Cleaning Liquid

The cleaning liquid for use in the present disclosure contains water, a compound represented by the following Chemical Formula 1, a glycol ether compound, and a surfactant and is used to rinse an ink, which contains water, a urethane resin having a glass transition temperature of 0 degrees C. or lower, a pigment, a compound represented by the following Chemical formula 1, and a surfactant.

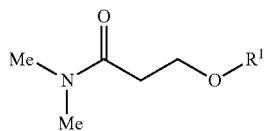

Chemical formula 1

In the Chemical formula 1, Me represents a methyl group, $R^1$ represents an alkyl group having 1 to 4 carbon atoms.

Compound Represented by Chemical Formula 1

The compound represented by Chemical formula 1 includes articles where $R^1$ is methyl group, ethyl group, propyl group, or butyl group. In the combinational use of the compound and the glycol ether compound, better cleaning property (cleaning power) is obtained than when the compound is used alone. In addition, sufficient storage stability can be obtained without separation the glycolether compound may cause. Due to the compound represented by the Chemical formula 1, the cleaning liquid has strong cleaning power to soften and remove fixated matter of, in particular, an ink which contains a urethane resin having a glass transition temperature (hereinafter referred to as Tg) of 0 degrees C. or lower.

The addition ratio of the compound represented by Chemical formula 1 contained in the cleaning liquid is preferably from 1 to 50 percent by mass and more preferably from 20 to 30 percent by mass in terms of improvement on cleaning power.

Synthesis Example of Compound Represented by Chemical Formula 1 where $R^1$ is Ethyl Group 19.828 g of N,N-dimethyl acrylamide and 19.868 g of ethanol are loaded and stirred in a separable flask (300 ml) equipped with a stirrer, a thermocouples, and a nitrogen gas introduction tube while introducing nitrogen gas thereinto. Next, 0.338 g of sodium-t-buthoxy is added to allow reaction at 35 degrees C. for four hours. After the reaction, 150 mg of phosphoric acid is added thereto to equalize a solution, which is thereafter left undone for three hours. The thus-obtained solution is filtrated to remove precipitates. Non-reacted matter is removed by an evaporator to obtain the compound (3-ethoxy-N,N-dimethyl propionamide, where $R^1$ is ethyl group) represented by Chemical formula 1.

Chemical formula 1

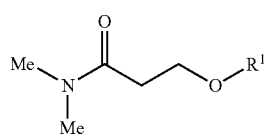

In the Chemical formula 1, $R^1$ represents ethyl group,

The compound represented by Chemical formula 1 is available on the market. A specific example of the product is Equamide™ M100 (manufactured by Idemitsu Kosan Co., Ltd.).

Glycolether Compound

The glycolether compound has no particular limit and can be suitably selected to suit to a particular application.

Specific examples of the glycolether compounds include, but are not limited to, ethylene glycol monobutylether, propyleneglycol monomethylether, propyleneglycol monobutylether, diethyleneglycol monoethylether, diethyleneglycol monobutylether, diethyleneglycol dibutylether, diethyleneglycol methylethylether, dipropyleneglycol monomethylether, diprpopylene monoethylether, dipropylene glycolmonobutylether, propyleneglycol-n-propylether, triethyleneglycolmonometylether, triethyleneglycolmonoethylether, triethyleneglycolmonobutylether, and tripropyleneglycol monomethylether. These can be used alone or in combination.

Of these, it is preferable to contain the dialkyl glycol ether compound represented by the following Chemical formula 2.

Chemical formula 2

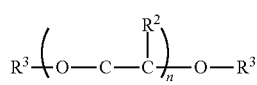

In Chemical formula 2, $R^2$ represents H or $CH_3$, $R^3$ represents $C_mH_{2m+1}$, n represents an integer of from 1 to 3, and m represents an integer of from 1 to 4.

Specific examples of the compound represented by Chemical formula 2 include, but are not limited to, diethyleneglycol dimethylether, dietyleneglycol diethylether, diethyleneglycol dibutylether, tetraethyleneglycol dimethyleter, and tetraethyleneglycol diethylether. glycolether compounds have strong power to work on ink film. Therefore, inclusion of glycolether compounds enhances cleanability (cleaning power). Moreover, dialkylglycol ether compounds easily soften dirt ascribable to a solvent.

The addition ratio of the glycolether compound contained in the cleaning liquid has no particular limit. Preferably, it is from 1 to 70 percent by mass to enhance cleaning power. When the addition ratio is from 20 to 30 percent by mass, cleaning power, discharging stability, and storage stability are excellent.

Furthermore, in addition to the glycolether mentioned above, the cleaning liquid preferably contains a glycolether compound having a water-solubility of 5 g/100 g (water) or less. Inclusion of such a glycolether compound having a water-solubility of 5 g/100 g (water) or less allows the cleaning liquid to act on hydrophobic dirt and enhance the power to act on dirt of ink film having a large amount of resins. In addition, a combinational use with, in particular, a dialkyl glycolether compound obtains better results than a single use of the glycolether compound.

Other Solvent

In the present disclosure, the cleaning liquid may contain other solvents as long as these do not have an adverse impact on the effect of the present disclosure.

The other solvent has no specific limit and can be suitably selected to suit to a particular application. For example, water-soluble organic solvents are usable.

The water-soluble organic solvent has no particular limit and can be suitably selected to suit to a particular application. Specific examples include, but are not limited to, polyols, ethers such as polyol alkyl ethers and polyol aryl ethers, nitrogen-containing heterocyclic compounds, amides, amines, sulfur-containing compounds, propylene carbonates, ethylene carbonate, polyol compounds having eight or more carbon atoms, and glycolether compounds that may optionally include a side chain. These can be used alone or in combination.

Specific examples of the polyol include, but are not limited to, ethylene glycol, diethylene glycol, 1,2-propanediol, 1,3-propane diol, 1,2-butanediol, 1,3-butanediol, 1,4-butanediol, 2,3-butanediol, 3-methyl1,3-butanediol, trethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and petriol.

Specific examples of nitrogen-containing heterocyclic compounds include, but are not limited to, 2-pyrolidone, N-methyl-2-pyrolidone, N-hydroxyethyle-2-pyrolidone, 1,3-dimethyl-2-imidazoline, ε-caprolactam, and γ-butylolactone.

Specific examples of the amide include, but are not limited to, formamide, N-methyl formamide, N,N-dimethylformamide, 3-methoxy-N,N-dimethyl propionamide, and 3-buthoxy-N,N-dimethylpropionamide.

Specific examples of the amine include, but are not limited to, monoethanol amine, diethanol amine, and triethyl amine.

Specific examples of the sulfur-containing compounds include, but are not limited to, dimethyl sulphoxide, sulfolane, and thiodiethanol.

Specific examples of the polyol compounds having eight or more carbon atoms include, but are not limited to, 2-ethyl-1,3-hexanediol and 2,2,4-trimethyl-1,3-pentanediol.

Specific examples of the glycolether compound that may optionally include a side chain, but are not limited to, diethyleneglycol isobutylether.

Surfactant

As the surfactant, it is possible to use any of silicone-based surfactants, fluorochemical surfactants, amphoteric surfactants, nonionic surfactants, or anionic surfactants.

The silicone-based surfactant has no particular limit and can be suitably selected to suit to a particular application. Of these, preferred are silicone-based surfactants which are not decomposed even in a high pH environment. Examples are side-chain-modified polydimethylsiloxane, both-distal-end-modified polydimethylsiloxane, one-distal-end-modified polydimethylsiloxane, and side-chain-both-distal-end-modified polydimethylsiloxane. A silicone-based surfactant having a polyoxyethylene group or a polyoxypropylene group as a modification group is particularly preferable because such an agent demonstrates good properties as an aqueous surfactant. It is possible to use a polyether-modified silicone-based surfactant as the silicone-based surfactant. A specific example is a compound in which a polyalkylene oxide structure is introduced into the side chain of the Si site of dimethyl silooxane.

Specific examples of the fluorochemical surfactants include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because they do not easily produce foams.

Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carboxylic acid compounds include, but are not limited to, perfluoroalkyl carboxylic acid and salts of perfluoroalkyl carboxylic acid.

Specific examples of the polyoxyalkylene ether polymer compounds having a perfluoroalkyl ether group in its side chain include, but are not limited to, salts of sulfuric acid ester of polyoxyalkylene ether polymer having a perfluoroalkyl ether group in its side chain and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

Of the surfactants, in terms of cleaning power and storage stability, polyoxyalkylene surfactants are preferable, and polyoxyethylene distyrenated phenylether and polyoxyethylene polyoxypropylene alkyleter are more preferable.

The polyoxyalkylene surfactant has no particular limit and can be suitably selected to suit to a particular application. For example, products thereof are available on the market.

Specific examples of the product available on the market include, but are not limited to, EMULGEN A-60 (polyoxyethylenedistyrenated phenylether), EMULGEN LS-106 (polyoxyethylenepolyoxypropylene alkylether), EMULGEN LS-110 (polyoxyethylene polyoxypropylene alkylether) (higher alcohol-based ether0rype nonionic surfactant, all manufactured by Kao Corporation). These can be used alone or in combination.

The silicone-based surfactant has no particular limit and can be suitably selected to suit to a particular application.

Specific examples include, but are not limited to, side-chain-modified polydimethyl siloxane, both distal-end-modified polydimethylsiloxane, one-distal-end-modified polydimethylsiloxane, and side-chain-both-distal-end-modified polydimethylsiloxane. In particular, a polyether-modified silicone-based surfactant having a polyoxyethylene group or a polyoxyethylene polyoxypropylene group is particularly preferable because such a surfactant demonstrates good property as an aqueous surfactant.

Any suitably synthesized surfactant and any product available on the market is suitable. Products available on the market can be obtained from Byc Chemie Japan Co., Ltd., Shin-Etsu Silicone Co., Ltd., Dow Corning Toray Co., Ltd., etc., NIHON EMULSION Co., Ltd., Kyoeisha Chemical Co., Ltd., etc.

The polyether-modified silicon-based surfactant has no particular limit and can be suitably selected to suit to a particular application. For example, a compound is usable in which the polyalkylene oxide structure represented by the following Chemical formula S-1 is introduced into the side chain of the Si site of dimethyl polysiloxane.

Chemical formula S-1

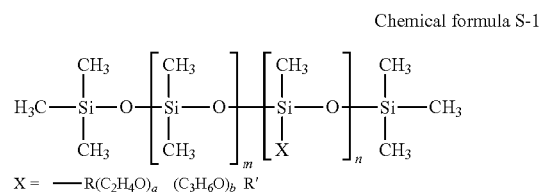

In the Chemical formula S-1, "m", "n", "a", and "b" each, respectively independently represent integers, R represents an alkylene group, and R' represents an alkyl group.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Japan KK.), and TSF4440, TSF4452, and TSF4453 (all manufactured by Momentive Performance Materials Inc.).

WET-240 (manufactured by Nissin Chemical Industry Co., Ltd.) and BYK-349 (manufactured by BYK Japan KK) are also suitably usable as the silicon-based surfactant. These can be used alone or in combination.

A fluorochemical surfactant in which the number of carbon atoms replaced with fluorine atoms is 2 to 16 is preferable and, 4 to 16, more preferable.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain.

Of these, polyoxyalkylene ether polymer compounds having a perfluoroalkyl ether group in its side chain are preferable because they do not foam easily and the fluorosurfactant represented by the following Chemical formula F-1 or Chemical formula F-2 is more preferable.

$$CF_3CF_2(CF_2CF_2)_m\text{—}CH_2CH_2O(CH_2CH_2O)_n H \quad \text{Chemical formula F-1}$$

In the compound represented by Chemical formula F-1, "m" is preferably 0 or an integer of from 1 to 10 and "n" is preferably 0 or an integer of from 1 to 40.

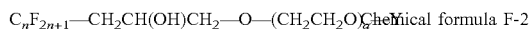
$$C_nF_{2n+1}\text{—}CH_2CH(OH)CH_2\text{—}O\text{—}(CH_2CH_2O)_a Y \quad \text{Chemical formula F-2}$$

In the Chemical formula F-2, Y represents H, $C_mF_{2m+1}$, where "m" is an integer of from 1 to 6, $CH_2CH(OH)CH_2\text{—}C_mF_{2m+1}$, where "m" represents an integer of from 4 to 6, or $C_pH_{2p+1}$, where p represents an integer of from 1 to 19. "n" represents an integer of from 1 to 6. "a" represents an integer of from 4 to 14.

As the fluorochemical surfactant, products available on the market may be used.

Specific examples include, but are not limited to, SURFLON S-111, SURFLON S-112, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300, UR, and Capstone™ FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Of these, in terms of improvement on print quality, in particular coloring property and permeability, wettability, and uniform dying property on paper, FS-3100, FS-34, and FS-300 of The Chemours Company, FT-110, FT-250, FT-251, FT-400S, FT-150, and FT-400SW of NEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

The surfactant in the cleaning liquid allows the cleaning liquid to penetrate into solidified matter of ink. The proportion of the surfactant in the cleaning liquid is not particularly limited and can be suitably selected to suit to a particular application. For example, it is preferably from 0.001 to 5 percent by mass and more preferably from 0.05 to 5 percent by mass in terms of excellent wettability and discharging stability and improvement on image quality.

Water

The proportion of the water is not particularly limited and can be suitably selected to suit to a particular application. For example, it is preferably from 10 to 80 percent by mass and more preferably from 10 percent by mass to 60 percent by mass to the total amount of the cleaning liquid. When the proportion is 10 percent by mass or greater, it is possible to sufficiently wipe off ink dirt from the interface of the nozzle surface, thereby securing sufficient discharging reliability. When the proportion is 80 percent by mass or less, it is possible to sufficiently swell the dirt. Also, addition of water allows the cleaning liquid to have no flame point.

Other Components

The cleaning liquid may furthermore optionally contain other components. The other optional components are not particularly limited and can be suitably selected to suit to a particular application. Examples are a permeating agent, defoaming agent, preservatives and fungicides, a pH regulator, and corrosion inhibitor.

Defoaming Agent

The defoaming agent has no particular limit and can be suitably selected to suit to a particular application. For example, silicon-based defoaming agents, polyether-based defoaming agents, and aliphatic acid ester-based defoaming agents are suitable. These can be used alone or in combination. Of these, silicone-based defoaming agents are preferable in terms of the effect of foam breaking.

Preservatives and Fungicides

The preservatives and fungicides are not particularly limited and can be suitably selected to suit to a particular application. A specific example is 1,2-benzisothiazoline-3-one.

Corrosion Inhibitor

The corrosion inhibitor has no particular limit and can be suitably selected to suit to a particular application. Specific examples include, but are not limited to, acid sulfites and sodium thiosulfates.

pH Regulator

The pH regulator has no particular limit as long as it can control pH not lower than 7. Specific examples include, but are not limited to, amines such as diethanol amine and triethanol amine.

The method of using the cleaning liquid of the present disclosure has no particular limit and can be suitably selected to suit to a particular application. For example, for an inkjet recording device including an inkjet head having a nozzle surface having a nozzle orifice of a nozzle to discharge liquid and ink for inkjet recording to record an image on a recording medium, it is preferable to spray the cleaning liquid to the nozzle surface or wipe off the nozzle surface with a cloth, etc. impregnated with the cleaning liquid to clean the nozzle surface or the nozzle. In addition, it is also allowed to substitute the ink in an inkjet recording device with the cleaning liquid and discharge the cleaning liquid from the discharging portion to clean the flow path, the inside of the head, and the periphery of the nozzle.

Ink

The ink for use in the present disclosure contains water, a urethane resin having a glass transition temperature (Tg) of 0 degrees C. or lower, a pigment as a coloring material, and the compound represented by Chemical formula 1. It may furthermore optionally contain other optional components.

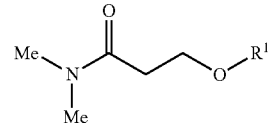

Chemical formula 1

In the Chemical formula 1, Me represents a methyl group, $R^1$ represents an alkyl group having 1 to 4 carbon atoms.

Inclusion of the urethane resin having a glass transition temperature (Tg) of 0 degrees C. or lower and the compound represented by Chemical formula 1 enhances film-forming of a resin. Good drying property is obtained and uniform applied film is obtained. Good attachability to a non-permeating substrate is also obtained. In particular, when the Tg of the polycarbonate-based urethane resin is −20 degrees C. or lower, better attachability and drying property can be obtained.

Such an ink achieves good atatchability and drying property due to its high film-forming ability. However, the ink is easily fixated on an ink discharging head, which causes defective discharging. To this ink, the cleaning liquid mentioned above can reduce fixation of the ink to the ink discharging head, so that it is possible to strike a balance between attachability to a substrate and fast drying and discharging stability.

Urethane Resin

The urethane resin has no particular limit and can be suitably selected to suit to a particular application as long as it has a glass transition temperature (Tg) of 0 degrees C. or lower. For example, polyurethane resin particle, etc. are suitably used, which are obtained by reacting polyol with polyisocyanate. Preferably, in terms of atatchability with a substrate, polycarbonate-based urethane resins having a Tg of −20 degrees or lower are preferable.

Polyol

Examples of the polyol are polyether polyols, polycarbonate polyols, and polyester polyols. These can be used alone or in combination.

Polyether Polyol

As the polyether polyol, for example, usable is an article obtained by addition polymerization of an alkyleneoxide to a starting material, which is at least one kind of compounds having two or more active hydrogen atoms.

Specific examples of the compound including two or more active hydrogen atoms include, but are not limited to, ethylene glycol, diethylene glycol, triethylene glycol, propylene glycol, trimethylene glycol, 1,3-butanediol, 1,4-butanediol, 1,6-hexanediol, glycerin, trimethylol ethane, and trimethylol propane. These can be used alone or in combination.

In addition, specific examples of the alkylene oxide include, but are not limited to, ethylene oxide, propylene oxide, butylene oxide, styrene oxide, epichlorohydrine, and tetrahydrofuran. These can be used alone or in combination.

The polyether polyol has not a particular limit and can be suitably selected to suit to a particular application. It is preferable to use polyoxytetramethylene glycol or polyoxypropylene glycol in order to obtain a binder for ink having extremely excellent scratch resistance. These can be used alone or in combination.

Polycarbonate Polyol

As polycarbonate polyol that can be used to manufacture the polyurethane resin particle, for example, a product obtained by reacting a carboxylic acid ester with a polyol or a phosgene with bisphenol A, etc. These can be used alone or in combination.

Specific examples of carboxylic acid esters include, but are not limited to, methyl carbonate, dimethyl carbonate, ethyl carbonate, diethyl carbonate, cyclocarbonate, and diphenyl carbonate. These can be used alone or in combination.

Specific examples of the polyol include, but are not limited to, dihydroxy compounds having a relatively low molecular weight such as ethylene glycol, diethylene glycol, triethylene glycol, 1,2-propylene glycol, 1,3-propylene glycol, dipropylene glycol, 1,4-butanediol, 1,3-butanediol, 1,2-butanediol, 2,3-butanediol, 1,5-pentane diol, 1,5-hexanediol, 2,5-hexanediol, 1,6-hexanediol, 1,7-heptane diol, 1,8-octane diol, 1,9-nonane diol, 1,10-decane diol, 1,11-undecane diol, 1,12-dodecane diol, 1,4-cyclohexanediol, 1,4-cyclohexane dimethanol, hydroquinone, resorcin, bisphenol A, bisphenol F, and 4,4'-biphenol, and polyether polyols such as polyethylene glycol, polypropylene glycol, and polyoxytetramethylene glycol, and polyester polyols such as polyhexanmethylene adipate, polyhexamethylene succinate, and polycaprolactone. These can be used alone or in combination.

Polyester Polyol

As the polyester polyol, for example, it is possible to use a product obtained by esterification reaction between a polyol having a low molecular weight and a polycarboxylic acid, a polyester obtained by a ring-opening polymerization reaction of a cyclic ester compound such as ε-caprolactone, or a copolymerized polyester thereof. These can be used alone or in combination.

Specific examples of the polyol having a low molecular weight include, but are not limited to, ethylene glycol and propylene glycol. These can be used alone or in combination. Specific examples of the polycarboxylic acid include, but are not limited to, succinic acid, adipic acid, sebacic acid, dodecane dicarboxylic acid, terephthalic acid, isophthalic acid, phthalic acid, and anhydrides or ester forming derivatives thereof. These can be used alone or in combination.

Polyisocyanate

Specific examples of the polyisocyanate include, but are not limited to, aromatic diisocyanates such as phenylene diisocyanate, tolylene diisocyanate, diphenylmethane diisocyanate, and naphthalene diisocyanate and aliphatic or alicyclic diisocyanates such as hexamethylene diisocyanate, lysine diisocyanate, cyclohexane diisocyanate, isophorone diisocyanate, dicyclohexylmethane diisocyanate, xylylene diisocyanate, tetramethyl xylylene diisocyanate, and 2,2,4-trimethyl hexamethylene diisocyanate. These can be used alone or in combination. Of these, using an alicyclic diisocyanate is preferable to form an ink film having an extremely high level of weather resistance for a long period of time taking it into account that the ink of the present disclosure is expected to be applied to posters, signboards, etc., for outdoor use.

Furthermore, it is preferable to add at least one kind of alicyclic diisocyanate, thereby easily acquiring a desired film robustness and scratch resistance.

Specific examples of the alicyclic diisocyanate include, but are not limited to, isophorone diisocyanate and dicyclohexylmethane diisocyanate.

The content ratio of the alicyclic diisocyanate is preferably 60 percent by mass or greater to the total content of the isocyanate compound.

Method of Manufacturing Polyurethane Resin Particle

The polyurethane resin particle can be manufactured by typical manufacturing methods. For example, the following method is suitable.

First, a urethane prepolymer having an isocyanate group at its distal end is prepared under the presence of no solvent or an organic solvent through the reaction of the polyol and the polyisocyanate with an equivalent ratio in which isocyanate groups are excessive.

Next, optionally the anionic group in the urethane prepolymer having an isocyanate group at its distal end is neutralized by a neutralizer. Thereafter, subsequent to reaction with a chain elongating agent, the organic solvent in the system is removed if necessary to obtain the urethane resin particle.

Specific examples of the organic solvent for use in manufacturing the polyurethane resin particle include, but are not limited to, ketones such as acetone and methylethyl ketone; ethers such as tetrahydrofuran and dioxane, acetic acid esters such as ethyl acetate and butylacetate, nitriles such as acetonitrile, and amides such as dimethyl formamide, N-methyl pyrolidone, and N-ethyl pyrolidone. These can be used alone or in combination.

Polyamines or other compounds having an active hydrogen group are used as the chain elongating agent.

Specific examples of the polyamine include, but are not limited to, diamines such as ethylene diamine, 1,2-propane diamine, 1,6-hexamethylene diamine, piperazine, 2,5-dimethyl piperazine, isophoronediamine, 4,4'-dicyclohexyl methane diamine, and 1,4-cyclohexane diamine, polyamines such as diethylenetriamine, dipropylene triamine, and triethylene tetramine, hydrazines such as hydradine, N,N'-dimethyl hydrazine, and 1,6-hexamethylene bis hydrazine, and dihydrazides such as succinic acid dihydrazide, adipic acid dihydrazide, glutaric acid dihydrazide, sebacic acid dihydrazide, and isophthalic acid dihydrazide. These can be used alone or in combination.

Specific examples of the compounds having active hydrogen groups include, but are not limited to, glycols such as ethylene glycol, diethylene glycol, triethylene glycol, propylene glycol, 1,3-propane diol, 1,3-butanediol, 1,4-butanediol, hexamethylene glycol, saccharose, methylene glycol, glycerin, and sorbitol; phenols such as bisphenol A, 4,4'-dihydroxydiphenyl, 4,4'-dihydroxydiphenyl ether, 4,4'-dihydroxydiphenyl sulfone, hydrogenated bisphenol A, and hydroquinone, and water. These can be used alone or in combination unless degrading the storage stability of ink.

As the polyurethane resin particle, polycarbonate-based polyurethane resin particles are preferable in terms of water resistance, heat resistance, abrasion resistance, weathering resistance, and scratch resistance of images due to high agglomeration power of carbonate groups. Ink obtained by using polycarbonate-based polyurethane resin particles is suitable for recorded matter for use in severe conditions like outdoor use.

As the polyurethane resin particle, products available on the market can be used.

Specific examples include, but are not limited to, UCOAT UX-485 (polycarbonate-based polyurethane resin particles), UCOAT UWS-145 (polyester-based polyurethane resin particles), PERMARIN UA-368T (polycarbonate-based polyurethane resin particles), and PERMARIN UA-200 (polyether-based polyurethane resin particles) (all manufactured by Sanyo Chemical Industries, Ltd.). These can be used alone or in combination.

The polyurethane resin particle is available on the market.

Specific examples include, but are not limited to, polyester-based polyurethane resin emulsion (WBR-601U, Tg: −30 degrees C., manufactured by TAISEI FINE CHEMICAL CO., LTD.) and polycarbonate-based polyurethane emulsion (SUPER FLEX 430, manufactured by DKS Co. Ltd.).

Coloring Material

The coloring material has no particular limit. For example, pigments and dyes are suitable.

As the pigment, inorganic pigments or organic pigments can be used. These can be used alone or in combination. In addition, it is possible to use a mixed crystal.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to titanium oxide, iron oxide, calcium carbonate, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used. Of those pigments, pigments having good affinity with solvents are preferable. Also, hollow resin particles and hollow inorganic particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material in the ink is preferably from 0.1 to 15 percent by mass and more preferably from 1 to 10 percent by mass in terms of enhancement of image density, fixability, and discharging stability.

To obtain an ink by dispersing a pigment, for example, a hydrophilic functional group is introduced into a pigment to prepare a self-dispersible pigment, the surface of a pigment is coated with a resin followed by dispersion, or a dispersant is used to disperse a pigment.

To prepare a self-dispersible pigment by introducing a hydrophilic functional group into a pigment, for example, it is possible to add a functional group such as sulfone group and carboxyl group to the pigment (e.g., carbon) to disperse the pigment in water.

To coat the surface of a pigment with a resin, the pigment is encapsulated by microcapsules to make the pigment dispersible in water. This can be referred to as a resin-coated pigment. In this case, all the pigments to be added to ink are not necessarily entirely coated with a resin. Pigments partially or wholly uncovered with a resin are allowed to be dispersed in the ink unless such pigments have an adverse impact.

In a method of using a dispersant to disperse a pigment, for example, a known dispersant having a small molecular weight or a large molecular weight, which is represented by a surfactant, is used to disperse the pigment in ink.

As the dispersant, it is possible to use, for example, an anionic surfactant, a cationic surfactant, a nonionic surfactant, an amphoteric surfactant, etc. depending on a pigment.

Also, a nonionic surfactant (RT-100, manufactured by TAKEMOTO OIL & FAT CO., LTD.) and a formalin condensate of naphthalene sodium sulfonate are suitable as the dispersant.

Those can be used alone or in combination.

The volume average particle diameter of the resin particle is not particularly limited and can be suitably selected to suit to a particular application. The volume average particle diameter is preferably from 10 to 1,000 nm, more preferably from 10 to 200 nm, and furthermore preferably from 10 to 100 nm to obtain good fixability and image hardness.

The volume average particle diameter can be measured by using, for example, a particle size analyzer (Nanotrac Wave-UT151, manufactured by MicrotracBEL Corp.).

The proportion of the resin is not particularly limited and can be suitably selected to suit to a particular application. In terms of fixability and storage stability of ink, it is preferably from 1 to 30 percent by mass and more preferably from 5 to 20 percent by mass to the total amount of the ink.

Pigment Dispersion

The ink can be obtained by mixing a pigment with materials such as water and an organic solvent. It is also possible to mix the pigment with water, a dispersant, etc., to prepare a pigment dispersion and thereafter mix the pigment dispersion with material such as water and an organic solvent to manufacture the ink.

The pigment dispersion is obtained by mixing and dispersing water, a pigment, a pigment dispersant, and other optional components and controlling the particle size. It is good to use a dispersing device for dispersion.

The particle diameter of the pigment in the pigment dispersion has no particular limit. For example, the maximum frequency is preferably from 20 to 500 nm and more preferably from 20 to 150 nm in the maximum number conversion to improve dispersion stability of the pigment and ameliorate discharging stability and the image quality such as image density. The particle diameter of the pigment can be measured using a particle size analyzer (Nanotrac Wave-UT 151, manufactured by MicrotracBEL Corp).

In addition, the proportion of the pigment in the pigment dispersion is not particularly limited and can be suitably selected to suit a particular application. In terms of improving discharging stability and image density, the proportion is preferably from 0.1 to 50 percent by mass and more preferably from 0.1 to 30 percent by mass.

It is preferable that the pigment dispersion be filtered with a filter, a centrifuge, etc. to remove coarse particles followed by degassing.

Compound Represented by Chemical Formula 1

The compound represented by the Chemical formula 1 as a component of the cleaning liquid can be used for ink. Of the compound represented by the Chemical formula 1, the compound represented by Chemical formula 1 for use in the ink and the compound represented by Chemical formula 1 for use in the cleaning liquid can be the same or different, Inclusion of the compound represented by Chemical formula 1 in the ink improves attachability between the ink and a substrate.

The addition ratio of the compound represented by Chemical formula 1 contained in the ink is preferably from 5 to 50 percent by mass, more preferably from 10 to 30 percent by mass, and furthermore preferably from 10 to 16 percent by mass in terms of improvement on attachability.

Surfactant

The surfactant for use in the ink has no particular limit about the kind and the mixing amount. The surfactant specified as the component for the cleaning liquid can be used for ink. The surfactant for use in the ink and the surfactant for use in the cleaning liquid can be the same or different.

The proportion of the surfactant in ink is not particularly limited and can be suitably selected to suit to a particular application. For example, it is preferably from 0.001 to 5 percent by mass and more preferably from 0.05 to 5 percent by mass in terms of excellent wettability and discharging stability and improvement on image quality.

Other Solvent

In the present disclosure, the ink may contain other solvents as long as these do not have an adverse impact on the effect of the present disclosure. The solvent specified as the component for the cleaning liquid can be used for the ink. The other solvents for use in the ink and the other solvents for use in the cleaning liquid can be the same or different.

Properties of ink are not particularly limited and can be suitably selected to suit to a particular application. For example, viscosity, surface tension, pH, etc, are preferable in the following ranges.

Viscosity of the ink at 25 degrees C. is preferably from 5 to 30 mPa·s and more preferably from 5 to 25 mPa·s to improve print density and text quality and obtain good dischargeability. Viscosity can be measured by, for example, a rotatory viscometer (RE-80L, manufactured by TOKI SANGYO CO., LTD.). The measuring conditions are as follows:

Standard cone rotor (1°34'×R24)
Sample liquid amount: 1.2 mL
Number of rotations: 50 rotations per minute (rpm)
25 degrees C.
Measuring time: three minutes The surface tension of the ink is preferably 35 mN/m or less and more preferably 32 mN/m or less at 25 degrees C. in terms of suitable leveling of ink on a recording medium and shortening drying time of the ink.

pH of the ink is preferably from 7 to 12 and more preferably from 8 to 11 in terms of prevention of corrosion of metal material in contact with liquid.

Recording Medium

The recording medium is not particularly limited. Plain paper, gloss paper, special paper, cloth, etc. are usable. Also, good images can be formed on a non-permeable substrate.

The non-permeable substrate has a surface with low moisture permeability and low absorbency and includes a material having myriad of hollow spaces inside but not open to the outside. To be more quantitative, the substrate has a water-absorption amount of 10 mL/m² or less from the start of the contact until 30 msec^(1/2) later according to Bristow method.

For example, plastic films such as vinyl chloride resin film, polyethylene terephthalate (PET) film, polypropylene film, polyethylene film, and polycarbonate film are suitably used as the non-permeable substrate.

The recording medium is not limited to articles used as typical recording media. It is suitable to use building materials such as wall paper, floor material, and tiles, cloth for apparel such as T-shirts, textile, and leather as the recording medium. In addition, the configuration of the paths through which the recording medium is conveyed can be adjusted to use ceramics, glass, metal, etc.

Ink Set for Inkjet Recording

The ink set for inkjet recording contains the cleaning liquid described above and the ink described above for inkjet recording. The ink contains a urethane resin having a Tg of 0 degrees C. or lower, so that, while the ink has a good attachability with a substrate, discharging reliability of a recording device is difficult to maintain. By using the ink set for inkjet recording, occurrence of defective discharging is prevented and discharging reliability can be maintained for printing with ink having good attachability and drying property.

Cleaning Method and Cleaning Device

The cleaning method of the present disclosure includes printing an image using an ink containing water, a urethane resin having a glass transition temperature of 0 degrees C. or lower, a pigment, a compound represented by the following Chemical Formula 1, and a surfactant and cleaning the nozzle surface of a discharging head to discharge the ink by using a cleaning liquid, the cleaning liquid containing water, a compound represented by the following Chemical Formula 1, a glycol ether compound, and a surfactant.

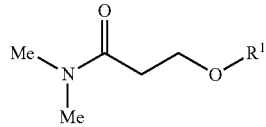

Chemical Formula 1

In the Chemical formula 1, Me represents a methyl group, $R^1$ represents an alkyl group having 1 to 4 carbon atoms.

The cleaning method of the present disclosure further includes applying the cleaning liquid to a wiping member (hereinafter also referred to as cleaning liquid application step), wiping off the nozzle surface with the wiping member to which the cleaning liquid is applied (hereinafter also referred to as wiping step), and preferably optionally other steps.

The cleaning device cleans the nozzle surface of a discharging head to discharge an ink using a cleaning liquid. The ink contains water, a urethane resin having a glass transition temperature of 0 degrees C. or lower, a pigment, a compound represented by the following Chemical Formula 1, and a surfactant. The cleaning liquid contains water, a compound represented by the following Chemical Formula 1, a glycol ether compound, and a surfactant.

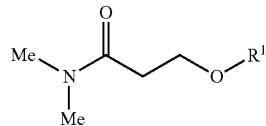

Chemical Formula 1

In the Chemical formula 1, Me represents a methyl group, $R^1$ represents an alkyl group having 1 to 4 carbon atoms.

The cleaning device includes a device to apply the cleaning liquid to a wiping (removing) member (hereinafter also referred to as cleaning liquid application device), a device to wipe off (hereinafter also referred to as wiping device) the nozzle surface with the wiping member to which the cleaning liquid is applied, and optionally other steps.

Cleaning Liquid Application Step and Cleaning Liquid Application Device

The cleaning liquid application step includes applying the cleaning liquid to the wiping member and preferably applying the cleaning liquid to the wiping member on a pressing member using the cleaning liquid application device.

The pressing member has no particular limit and can be suitably selected to suit to a particular application as long as it can press the nozzle surface via the wiping member.

Specific examples include, but are not limited to, a pressing roller, a combination of a pressing roller and a pressing belt, a wiper, and a blade. Of these, the pressing roller is preferable.

The cleaning liquid applying device has no particular limit and can be suitably selected to suit to a particular application as long as the cleaning liquid can be applied in a constant amount. For example, nozzles, sprays, dispensers, and applicators can be used.

The wiping member has no specific limit and can be suitably selected to suit to a particular application. For example, unwoven fabric and cloth can be used. Preferably, an article is rolled up in a roll-like form. Unwoven fabric having a roll-like form is preferable because it is highly reliable and does not easily produce dust.

It is preferable that the recording time control the supply amount of the cleaning liquid. In this case, it is more preferable to select the application amount of the cleaning liquid from multiple set values. The multiple set values are, for example, pressure, number of supplies, and number of nozzles. It is preferable to control the application amount of the cleaning liquid by a pressure applied to a cleaning liquid application nozzle as a cleaning liquid application device. In addition, if the cleaning liquid is applied from multiple cleaning liquid application nozzles, it is preferable to control the application amount of the cleaning liquid by the number of the cleaning liquid application nozzles. Moreover, it is preferable to control the application amount of the cleaning liquid to the wiping member by the number of application of the cleaning liquid from the cleaning liquid application nozzle.

Wiping Process and Wiping Device

The wiping process includes wiping the nozzle surface with the wiping member to which the cleaning liquid is applied and is preferably executed by the wiping device.

The method of wiping off the nozzle surface with the wiping member to which the cleaning liquid is applied has no particular limit and can be suitably selected to suit to a particular application. For example, unwoven cloth as the wiping member to which the cleaning liquid is applied is pressed against the nozzle surface of the ink discharging head by a pressing roller as the pressing member.

Other Processes and Other Devices

The other processes and the other devices include, for example, a control process and a control device.

For example, devices such as a sequencer and a computer can be used.

Figure 3:
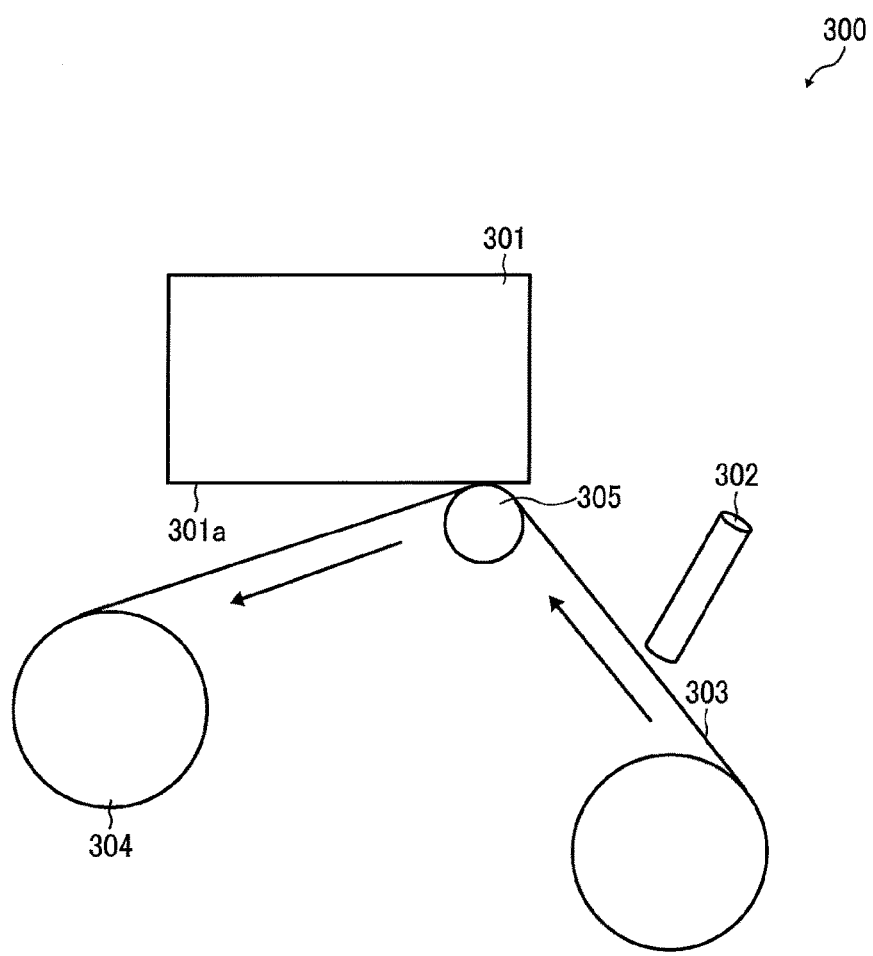
FIG. 3 is a schematic diagram illustrating an example of the cleaning device according to an embodiment of the present disclosure.

FIG. 3 is a schematic diagram illustrating an example of the cleaning device for use in the present disclosure. As illustrated in FIG. 3, a cleaning device 300 cleans a nozzle surface 301a of an ink discharging head 301 on the side of ink discharging.

The cleaning device 300 includes an unwoven 303 as the wiping member, a cleaning liquid application nozzle 302 as the cleaning liquid application device, a pressing roller 305 as the pressing member, and a roll-up roller 304 to roll up the unwoven fabric after the wiping process.

The cleaning liquid is supplied from a cleaning liquid tank via a cleaning liquid supply tube. By driving a pump disposed in the middle of the cleaning liquid supply tube, the cleaning liquid application nozzle 302 applies the cleaning liquid to the unwoven fabric 303 as the wiping member in an amount in accordance with the recording time. The unwoven fabric 303 is rolled up in a roll-like form.

As illustrated in FIG. 3, the unwoven fabric 303 to which the cleaning liquid is applied is brought into contact with the nozzle surface 301a of the ink discharging head 301 under a pressure applied by the pressing roller as the pressing member so that the nozzle surface 301a is cleaned. After the wiping process, the unwoven fabric 303 is rolled up by a roll-up roller 304.

It is possible to have multiple cleaning liquid application nozzles 302. A pressure is applied thereto based on the control of the control device. The application amount of the cleaning liquid can be adjusted by suitably changing the pressure. In addition, based on the control of the control device, the number of nozzles to apply the cleaning liquid is changed to adjust the application amount of the cleaning liquid. In addition, based on the control of the control device, the number of application of the cleaning liquid is changed to adjust the application amount of the cleaning liquid.

The method of cleaning the nozzle surface of the ink discharging head on the side of ink discharging is as follows:

At the time of application of the cleaning liquid, a pressure can be applied to the cleaning liquid application nozzle. The application amount of the cleaning liquid can be adjusted suitable by changing the pressure. In addition, it is possible to adjust the application amount of the cleaning liquid by changing the number of nozzles of the multiple nozzles to which the cleaning liquid is applied. Furthermore, it is possible to adjust the application amount by changing the number of applications of the cleaning liquid through the nozzles to which the cleaning liquid is applied. The nozzle surface after recording can be wiped off using the wiping member to which the cleaning liquid is applied.

Inkjet Recording Method and Inkjet Recording Device

The inkjet recording method relating to the present disclosure includes discharging the ink through the discharging head to discharge the ink, cleaning the nozzle surface of the discharging head, and other optional processes.

The cleaning process is executed by the cleaning method of the present disclosure.

The inkjet printing device of the present disclosure includes an ink, an ink discharging head to discharge the ink, a cleaning liquid, and preferably a wiping member to wipe off the nozzle surface of the discharging head. It may furthermore include other devices.

The ink contains water, a urethane resin having a glass transition temperature of 0 degrees C. or lower, a pigment, a compound represented by the following Chemical Formula 1, and a surfactant. The cleaning liquid includes water, a compound represented by the following Chemical Formula 1, a glycol ether compound, and a surfactant, Chemical Formula 1

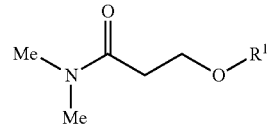

In the Chemical formula 1, Me represents a methyl group, $R^1$ represents an alkyl group having 1 to 4 carbon atoms.

Recording Device and Recording Method

The ink for use in the present disclosure can be suitably applied to various recording devices employing an inkjet recording method, such as printers, facsimile machines, photocopiers, multifunction peripherals (serving as a printer, a facsimile machine, and a photocopier), and solid freeform fabrication devices (3D printers, additive manufacturing device).

In the present disclosure, the recording device and the recording method respectively represent a device capable of discharging ink, various processing fluids, etc. to a recording medium and a method of recording utilizing the device. The recording medium means an article to which ink or various processing fluids can be attached temporarily or permanently.

The recording device may further optionally include a device relating to feeding, conveying, and ejecting a recording medium and other devices referred to as a pre-processing device, a post-processing device, etc. in addition to the head portion to discharge the ink.

The recording device and the recording method may further optionally include a heating device (heater) for use in the heating process and a drying device (drier) for use in the drying process. For example, the heating device and the drying device include devices including heating and drying the print surface of a recording medium and the opposite surface thereof. The heating device and the drying device are not particularly limited. For example, a fan heater and an infra-red heater can be used. Heating and drying can be conducted before, in the middle of, or after printing.

In addition, the recording device and the recording method are not limited to those producing meaningful visible images such as texts and figures with ink. For example, the recording method and the recording device capable of producing patterns like geometric design and 3D images are included.

In addition, the recording device includes both a serial type device in which the discharging head is allowed to move and a line type device in which the liquid discharging head is not moved, unless otherwise specified.

Furthermore, in addition to the desktop type, this recording device includes a device capable of printing images on a wide recording medium such as AO and a continuous printer capable of using continuous paper rolled up in a roll-like form as a recording medium.

Figure 2:
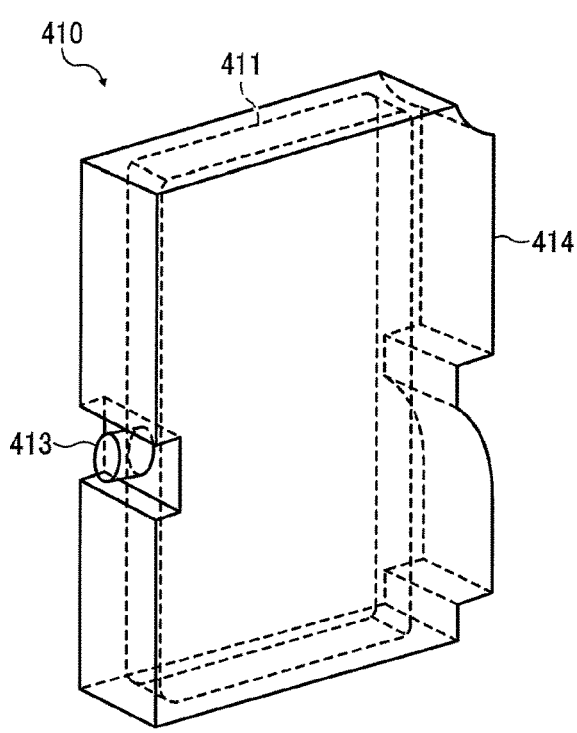
FIG. 2 is a diagram illustrating a perspective view of an example of the main tank of the device illustrated in FIG. 1.

The recording device is described using an example with reference to FIG. 1 and FIG. 2. FIG. 1 is a diagram illustrating a perspective view of the recording device. FIG.

2 is a diagram illustrating a perspective view of the main tank. An image forming apparatus 400 as an embodiment of the recording device is a serial type image forming apparatus. A mechanical unit 420 is disposed in an exterior 401 of the image forming apparatus 400. Each ink accommodating unit (ink container) 411 of each main tank 410 (410k, 410c, 410m, and 410y) for each color of black (K), cyan (C), magenta (M), and yellow (Y) is made of a packaging member such as aluminum laminate film. The ink accommodating unit 411 is housed in, for example, a plastic container housing unit 414. As a result, the main tank 410 is used as an ink cartridge of each color.

A cartridge holder 404 is disposed on the rear side of the opening appearing when a cover 401c is opened. The cartridge holder 404 is detachably attached to the main tank 410.

This enables each ink outlet 413 of the main tank 410 to communicate with a discharging head 434 for each color via a supplying tube 436 for each color so as to discharge the ink from the discharging head 434 to a recording medium.

Image forming, recording, printing, print, etc. in the present disclosure represent the same meaning.

An example of the recording device relating to the present disclosure is the device illustrated in FIG. 1 carrying the cleaning device illustrated in FIG. 3.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

The present invention is described in detail with reference to Examples but not limited to the following Examples.

Preparation Example 1 of Black Pigment Dispersion

After preliminarily mixing the following recipe, the mixture was subject to circulation dispersion for seven hours with a disk type bead mill (KDL type, media: zirconia ball having a diameter of 0.3 mm, manufactured by SHINMARU ENTERPRISES CORPORATION) to obtain a black pigment dispersion (concentration of pigment solid portion: 15 percent by mass).

Carbon black pigment (Product: Monarch 800, manufactured by Cabot Corporation): 15 parts
Anionic surfactant (Product: Pionine A-51-B, manufactured by TAKEMOTO OIL & FAT Co., Ltd.): 2 parts
Deionized water: 83 parts
Preparation of Polyurethane Resin Emulsion 1

100 parts of methylethyl ketone, 345 parts of polyester-polyol 1 (which was obtained from iPA/AA=6/4 in molar ratio and EG/NPG=1/9 in molar ratio, where iPA=isophthalic acid, AA=adipic acid, EG=ethylene glycol, and NPG=neopentyl glycol, number average molecular weight=2,200, average of number of functional groups=2) and 9.92 parts by mass of 2,2-dimethylol propionic acid (DMPA) were placed in a reaction container of 2 L equipped with a stirrer, a thermometer, a nitrogen sealing tube, and a condenser and uniformly mixed at 60 degrees C. Thereafter, 45.1 parts of triethylene glycol diisocyanate (TEGDI) and 0.08 parts of dioctyltin dilaurate (DOTDL) were loaded therein to allow reaction at 72 degrees C. for three hours to obtain a polyurethane solution.

To this polyurethane solution, 80 parts of isopropyl alcohol (iPA), 220 parts of methylethyl ketone (MEK), 3.74 parts of triethylamine (TEA), and 596 parts of water were loaded to cause transfer phase. Subsequently, MEK and iPA were removed by a rotary evaporator to obtain a polyurethane resin emulsion 1. After the thus-obtained polyurethane resin emulsion 1 was cooled down to room temperature, deionized water and aqueous solution of sodium hydroxide were added to adjust the solution such that the solid portion thereof was 30 percent by mass and the pH was 8. The glass transition temperature (Tg) of the polyurethane resin emulsion 1 was −3 degrees as measured by Thermo plus EVO2 (manufactured by Rigaku).

Example 1

Preparation of Ink and Cleaning Liquid
Preparation of Black Ink
A black ink for use in Example 1 was manufactured in the following manner:

The black pigment dispersion (20 percent by mass) manufactured according to the method specified above (Preparation Example 1 of Black Pigment Dispersion), the polyurethane resin emulsion (concentration of solid portion: 30 percent by mass), 1,2-propane diol (12 percent by mass), 1,3-propane diol (10 percent by mass), 1,2-butane diol (3 percent by mass), the compound represented by Chemical formula 1 ($R^1$=methyl group) (Equamide™ M100, manufactured by Idemitsu Kosan Co., Ltd.) (16 percent by mass), a fluorochemical surfactant (FS-300, concentration of solid portion: 40 percent) (2 percent by mass), a preservative (Proxel LV, manufactured by AVECIA GROUP) (0.1 percent by mass), and highly pure water (balance) were mixed and stirred and thereafter filtrated by a polypropylene filter (Betafine polypropylene pleated filter PPG series, manufactured by 3M Company) having an average opening diameter of 0.2 µm.

Preparation of Cleaning Liquid
Tripropyleneglycol monomethylether (20 percent by mass) (manufactured by Tokyo Chemical Industry Co. Ltd.), the compound represented by Chemical formula 1 ($R^1$=methyl group) (30 percent by mass) (Equamide™ M100, manufactured by Idemitsu Kosan Co., Ltd.), a fluorochemical surfactant (FS-300, concentration of solid portion: 40 percent) (2 percent by mass), and deionized water (balance, by which the total of the material added up to 100 percent by mass).

Example 2

Ink and cleaning liquid were manufactured in the same manner as in Example 1 except that the polyurethane resin emulsion of the ink was changed to polyester-based polyurethane emulsion (WBR-601U, manufactured by TAISEI FINE CHEMICAL CO., LTD.) and the glycolether compound of the cleaning liquid was changed from tripropyleneglycol monomethylether to dipropylene glycolmethylether (manufactured by Tokyo Chemical Industry Co. Ltd.).

Polyester-based polyurethane emulsion: WBR-601U (Tg: −30 degrees C., manufactured by TAISEI FINE CHEMICAL CO., LTD.)

Example 3

Ink and cleaning liquid were manufactured in the same manner as in Example 1 except that the polyurethane resin emulsion of the ink was changed to polycarbonate-based polyurethane emulsion (SUPERFLEX® 430, manufactured by DKS Co. Ltd.), the glycolether compound of the cleaning liquid was changed from tripropyleneglycol monomethylether to triethylene glycolmonomethylether (manufactured by Tokyo Chemical Industry Co. Ltd.), the addition amount was increased from 20 to 30 percent by mass, and the addition amount of Equamide™ M100 was changed from 30 to 20 percent by mass.

Polycarbonate-based polyurethane emulsion (SUPERFLEX® 430, Tg: −24 degrees C., manufactured by DKS Co. Ltd.)

Example 4

Ink and cleaning liquid were manufactured in the same manner as in Example 1 except that the glycolether compound of the cleaning liquid was changed from tripropyleneglycol monomethylether to diethylene glycoldiethylether (manufactured by Tokyo Chemical Industry Co. Ltd.).

Example 5

Ink and cleaning liquid were manufactured in the same manner as in Example 1 except that the glycolether compound of the cleaning liquid was changed from tripropyleneglycol monomethylether to diethylene glycoldiethylether (manufactured by Tokyo Chemical Industry Co. Ltd.), and the surfactant of the cleaning liquid was changed from the fluorochemical surfactant (FS-300) to polyoxyethylenedistyrenated phenylether (EMULGEN A-60 (higher alcohol-based ether type nonionic surfactant, manufactured by Kao Corporation).

Example 6

Ink and cleaning liquid were manufactured in the same manner as in Example 1 except that the polyurethane resin emulsion of the ink was changed to polycarbonate-based polyurethane emulsion (SUPERFLEX® 430, manufactured by DKS Co. Ltd.), the glycolether compound of the cleaning liquid was changed from tripropyleneglycol monomethylether to diethylene glycol dibutylether, the addition amount was increased from 20 to 30 percent by mass, the addition amount of Equamide™ M100 was decreased from 30 to 20 percent by mass, and the surfactant of the cleaning liquid was changed from the fluorochemical surfactant (FS-300) to polyoxyethylene polyoxypropylene alkylether (EMULGEN LS-106 (higher alcohol-based ether type nonionic surfactant, manufactured by Kao Corporation).

Example 7

Ink and cleaning liquid were manufactured in the same manner as in Example 1 except that $R^1$ of the Chemical formula 1 constituting the cleaning liquid was changed to butyl group (Equamide™ B100, manufactured by Idemitsu Kosan Co., Ltd.).

Comparative Example 1

Ink and cleaning liquid were manufactured in the same manner as in Example 1 except that the cleaning liquid contained no tripropyleneglycol monomethylether and the addition amount of Equamide™ M100 was increased from 30 to 50 percent by mass.

Comparative Example 2

Ink and cleaning liquid were manufactured in the same manner as in Example 1 except that the addition amount of tripropyleneglycol monomethylether of the cleaning liquid was increased from 20 to 50 percent by mass and the cleaning liquid contained no Equamide™ M100.

The formulation of the ink and the cleaning liquid for use in each Example and Comparative Example are shown in Tables 1-1 and 1-2. Percent in Table 1-1 represents percent by mass.

TABLE 1-1

| | Material Ink added urethane resin material | | |
|---|---|---|---|
| | Name | Kind of polyol | Glass Transition Temperature (Tg) |
| EXAMPLE 1 | Polyurethane resin emulsion 1 | Polyester-based | −3 degrees C. |
| EXAMPLE 2 | WBR-601U | Polyester-based | −30 degrees C. |
| Example 3 | SUPER FLEX 430: | Polycarbonate-based | −24 degrees C. |
| Example 4 | Polyurethane resin emulsion 1 | Polyester-based | −3 degrees C. |
| Example 5 | Polyurethane resin emulsion 1 | Polyester-based | −3 degrees C. |
| Example 6 | SUPER FLEX 430: | Polycarbonate-based | −24 degrees C. |
| Example 7 | Polyurethane Resin Emulsion 1 | Polyester-based | −3 degrees C. |
| Comparative Example 1 | Polyurethane Resin Emulsion 1 | Polyester-based | −3 degrees C. |
| Comparative Example 2 | Polyurethane Resin Emulsion 1 | Polyester-based | −3 degrees C. |

| | Material Cleaning Liquid added material | | |
|---|---|---|---|
| | Glycolether compound | Compound represented by Chemical formula 1 | Surfactant |
| Example 1 | Tripropyleneglycol monomethylether: 20 percent | Equamide™ M100.30 percent | Fluorochemical surfactant (FS-300, fluorochemical surfactant manufactured by E. I. du Pont de Nemours and Company) |
| Example 2 | Dipropyleneglycol methylether: 20 percent | Equamide™ M100.30 percent | Fluorochemical surfactant (FS-300, fluorochemical surfactant manufactured by E. I. du Pont de Nemours and Company) |
| Example 3 | Triethylene glycol mono methyl ether 30% | Equamide™ M100.20 percent | Fluorochemical surfactant (FS-300, fluorochemical surfactant |

TABLE 1-1-continued

| | | | |
|---|---|---|---|
| Example 4 | Diethylene glycol diethylether 20 percent | Equamide ™ M100.30 percent | Fluorochemical surfactant (FS-300, fluorochemical surfactant manufactured by E. I. du Pont de Nemours and Company) |
| Example 5 | Diethylene glycol diethylether 20 percent | Equamide ™ M100.30 percent | Polyoxyethylene-distyrenated phenylether A-60 |
| Example 6 | Diethylene glycol dibutylether 30 percent | Equamide ™ M100.20 percent | Polyoxyethylene polyoxypropylene alkylether EMULGEN LS-106 |
| Example 7 | Tripropyleneglycol monomethylether: 20 percent | Equamide ™ B100.30 percent | Fluorochemical surfactant (FS-300, fluorochemical surfactant manufactured by E. I. du Pont de Nemours and Company) |
| Comparative Example 1 | Non-added | Equamide ™ M100.50 percent | Fluorochemical surfactant (FS-300, fluorochemical surfactant manufactured by E. I. du Pont de Nemours and Company) |
| Comparative Example 2 | Tripropyleneglycol monomethylether: 50 percent | Non-added | Fluorochemical surfactant (FS-300, fluorochemical surfactant manufactured by E. I. du Pont de Nemours and Company) |

TABLE 1-2

| | Evaluation results | | | |
|---|---|---|---|---|
| | Substrate attachability | | | |
| | Attachability heated at 60 degrees C. for 10 minutes | Attachability heated at 70 degrees C. for 10 minutes | Cleaning power | |
| | | | Discharging reliability | Cleaning power |
| Example 1 | A | A | B | B |
| Example 2 | A | AA | B | B |
| Example 3 | AA | AA | B | B |
| Example 4 | A | A | A | A |
| Example 5 | A | A | A | S |
| Example 6 | AA | AA | A | S |
| Example 7 | A | A | B | B |
| Comparative Example 1 | A | A | C | C |
| Comparative Example 2 | A | A | C | C |

Evaluation Method

Cleaning Power

The ink of Example 1 was continuously discharged for 45 minutes using the printer illustrated in FIG. 1. The nozzle surface of the discharging head was dried for 12 hours after the discharging. Thereafter, using a dropper, 3 mL of the cleaning liquid of Example 1 was applied to ANTICON™ (clean wiper, ANTICON™ GOLD, polyester filament), and the device illustrated in FIG. 3 wiped off the nozzle surface back and forth once. Thereafter, cleaning power was evaluated based on the following evaluation criteria B and above rated in the evaluation are preferable in terms of practical use. Each of the cleaning liquids and the inks of the other Examples and the other Comparative Examples was evaluated based on the combinations thereof shown in Table 1-1 in the same manner.

Evaluation Criteria

S: No wiping remnant of ink dirt

A: Wiping remnant of ink dirt was less than 10 percent but no remnant around nozzle observed B: Wiping remnant of ink dirt was less than 10 percent D: Wiping remnant of ink dirt was 10 percent or greater Discharging Reliability The ink of Example 1 was continuously discharged for 45 minutes using the printer illustrated in FIG. 1, and the nozzle surface of the discharging head was dried for 30 minutes after the discharging. Thereafter, using a dropper, 3 mL of the cleaning liquid of Example 1 was applied to ANTICON™ (clean wiper, ANTICON™ GOLD, polyester filament) and the device illustrated in FIG. 3 wiped off the nozzle surface. Thereafter, the ink of Example 1 was discharged again to evaluate discharging reliability based on the following evaluation criteria. B and above rated in the evaluation are preferable in terms of practical use. Each of the cleaning liquids and the inks of the other Examples and the other Comparative Examples was evaluated based on the combinations thereof shown in Table 1-1 in the same manner.

Evaluation Criteria

A: No discharging disturbance and no non-discharging occurred at all

B: Discharging disturbance and non-discharging occurred at 5 nozzles or less but recovered soon C: Discharging disturbance and non-discharging occurred Attachability Method of Preparing Evaluation Image IPSiO GXe 5500 (manufactured by Ricoh Company Ltd.) was remodeled to achieve a recoding speed corresponding to 30 $m^2$/hr for a printing width of 150 cm on A4 size recording medium. In addition, the hot plate was remodeled to be able to change the heating conditions (heating temperature and heating time) for images after recording. The remodeled IPSiO GXe 5500 was filled with the black ink of Example 1 and recorded a solid image with an ink attachment amount of 0.6 g/$cm^2$ on a recording medium. The recording medium used was PP film recording medium (P2161, manufactured by TOYOBO CO., LTD.). After the recording, the recording medium was heated at the hot plate. The heating condition was the following two conditions.

Condition 1 60 degrees C. for five minutes

Condition 2 70 degrees C. for five minutes

Evaluation Method for Attachability

According to the grid peeling test using a cloth adhesive tape (123 LW-50, manufactured by Nichiban Co., Ltd.) for the solid image after heating, the number of grids remaining in the 100 test grids was counted to evaluate attachability to recording medium based on the following evaluation criteria. B and above in the evaluation are preferable in terms of practical use. Each of the inks of the other Examples and the other Comparative Examples was evaluated in the same manner changing the ink shown in Table 1-1.

Evaluation Criteria
AA: Number of remaining grids was 98 or greater
A: Number of remaining grids was 90 to less than 98
B: Number of remaining grids was 70 to less than 90
C: Number of remaining grids was less than 70
The evaluation results of cleaning power, discharging reliability, and attachability of each Example and Comparative Example are shown in Table 1-2.

Comparison Between Examples and Comparative Examples

While the cleaning liquid in Example 1 contained both of the compound represented by Chemical formula 1 and the glycolether compound, the cleaning liquid containing no glycolether compound was used in Comparative Example 1 and the cleaning liquid containing no compound represented by Chemical formula 1 was used in Comparative Example 2. The comparison results between Example 1 and Comparative Example 1, and Comparative Example 2 show that cleaning power and discharging stability of Comparative Example 1 and Comparative Example 2 were inferior to those of Example 1.

As seen in the comparison results between Example 1. Example 2, and Example 3, attachability to substrate in Example 3 was better than those of Examples 1 and 2 since the resin in the ink in Example 3 was a polycarbonate-based polyurethane resin having a Tg of −20 degrees C. or lower. In comparison between Example 1 and Example 4, cleaning power was better in Example 4 than in Example 1 since the glycolether compound used in Example 4 was represented by the Chemical formula 2. In comparison between Example 4 and Example 5, cleaning power was further better in Example 5 than Example 4 since the surfactant of the cleaning liquid in Example 5 was the polyoxyalkylene surfactant. The compositions contained in the inks and cleaning liquids of each Example and each Comparative Example are shown in Table 2.

TABLE 2

| | Ink | | |
| | Urethane Tg: 0 degrees C. or lower | Urethane Tg: −20 degrees C. or lower polycarbonate-based | Compound represented by Chemical formula 1 |
| --- | --- | --- | --- |
| Example 1 | Yes | No | Yes |
| Example 2 | Yes | No | Yes |
| Example 3 | Yes | Yes | Yes |
| Example 4 | Yes | No | Yes |
| Example 5 | Yes | No | Yes |
| Example 6 | Yes | Yes | Yes |
| Example 7 | Yes | No | Yes |
| Comparative Example 1 | Yes | No | Yes |
| Comparative Example 2 | Yes | No | Yes |

| | Cleaning Liquid | | | |
| | Glycolether compound | Dialkyl glycolether compound | Compound represented by Chemical formula 1 | Polyoxyalkylene surfactant |
| --- | --- | --- | --- | --- |
| Example 1 | Yes | No | Yes | No |
| Example 2 | Yes | No | Yes | No |
| Example 3 | Yes | No | Yes | No |
| Example 4 | Yes | Yes | Yes | No |
| Example 5 | Yes | Yes | Yes | Yes |
| Example 6 | Yes | Yes | Yes | Yes |
| Example 7 | Yes | No | Yes | No |
| Comparative Example 1 | No | No | Yes | No |
| Comparative Example 2 | Yes | No | No | No |

Aspects of the present disclosure are, for example, as follows:

1. An inkjet recording device includes an ink, a discharging head to discharge the ink, and a cleaning liquid, wherein the ink contains water, a urethane resin having a glass transition temperature of 0 degrees C. or lower, a pigment, a compound represented by the following Chemical Formula 1, and a surfactant, wherein the cleaning liquid contains water, a compound represented by the following Chemical formula 1, a glycol ether compound, and a surfactant,

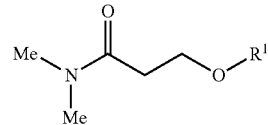

Chemical formula 1 where Me represents a methyl group, $R^1$ represents an alkyl group having 1 to 4 carbon atoms.

2. The inkjet recording device according to 1 mentioned above, further includes a wiping member to wipe off a nozzle surface of the discharging head.

3. The inkjet recording device according to 1 or 2 mentioned above, wherein the urethane resin contains a polycarbonate-based urethane resin and has a glass transition temperature of −20 degrees C. or lower.

4. The inkjet recording device according to any one of 1 to 3 mentioned above, wherein the glycol ether compound contains a dialkylglycol ether compound represented by the following Chemical formula 2,

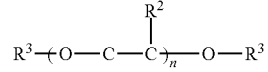

Chemical formula 2 where $R^2$ represents H or $CH_3$, $R^3$ represents $C_mH_{2m+1}$, n represents an integer of from 1 to 3, and m represents an integer of from 1 to 4.

5. The inkjet recording method according to any one of 1 to 4 mentioned above, wherein the surfactant contained in the cleaning liquid contains a polyoxyalkylene surfactant.

6. A cleaning device to clean a nozzle surface of a discharging head to discharge an ink with a cleaning liquid, wherein the ink contains water, a urethane resin having a glass transition temperature of 0 degrees C. or lower, a pigment, a compound represented by the following Chemical formula 1, and a surfactant and the cleaning liquid comprises water, a compound represented by the following Chemical formula 1, a glycol ether compound, and a surfactant,

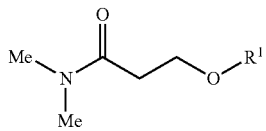

Chemical formula 1 where Me represents a methyl group, $R^1$ represents an alkyl group having 1 to 4 carbon atoms.

7. The cleaning device according to 6 mentioned above, further includes an application device to apply the cleaning liquid to a wiping member and a wiping device to wipe off the nozzle surface with the wiping member to which the cleaning liquid is applied.

8. A cleaning method includes printing an image using an ink containing water, a urethane resin having a glass transition temperature of 0 degrees C. or lower, a pigment, a compound represented by the following Chemical formula 1, and a surfactant; and cleaning with a cleaning liquid a nozzle surface of a discharging head to discharge the ink, the cleaning liquid contains water, a compound represented by the following Chemical formula 1, a glycol ether compound, and a surfactant,

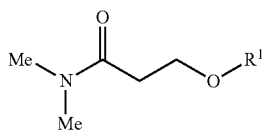

Chemical formula 1 where Me represents a methyl group, $R^1$ represents an alkyl group having 1 to 4 carbon atoms.

9. The cleaning method according to 8 mentioned above, further including applying the cleaning liquid to a wiping member and wiping off the nozzle surface with the wiping member to which the cleaning liquid is applied.

10. An inkjet recording method includes discharging an ink through a nozzle of a discharging head and cleaning a nozzle surface of the discharging head, wherein the cleaning is conducted by the cleaning method of 8 or 9 mentioned above.

11. A cleaning liquid containing water, a compound represented by the following Chemical formula 1, a glycol ether compound, and a surfactant and is used to rinse an ink, which contains water, a urethane resin having a glass transition temperature of 0 degrees C. or lower, a pigment, a compound represented by the following Chemical formula 1, and a surfactant,

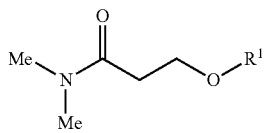

Chemical formula 1 where Me represents a methyl group, R1 represents an alkyl group having 1 to 4 carbon atoms.

12. The cleaning liquid according to 11 mentioned above, wherein the urethane resin includes a polycarbonate-based urethane resin and has a glass transition temperature of −20 degrees C. or lower.

13. The cleaning liquid according to 11 or 12 mentioned above, wherein the glycol ether compound contains a dialkylglycol ether compound represented by the following Chemical formula 2,

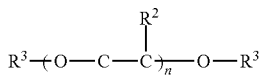

Chemical formula 2 where $R^2$ represents H or $CH_3$, $R_3$ represents $C_mH_{2m+1}$, n represents an integer of from 1 to 3, and m represents an integer of from 1 to 4.

14. The cleaning liquid according to any one of 11 to 13 mentioned above, wherein the surfactant contained in the cleaning liquid includes a polyoxyalkylene surfactant.

15. A set contains an ink containing water, a urethane resin having a glass transition temperature of 0 degrees C. or lower, a pigment, a compound represented by the following Chemical formula 1, and a surfactant and a cleaning liquid containing water, a compound represented by the following Chemical formula 1, a glycol ether compound, and a surfactant,

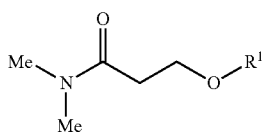

Chemical formula 1 where Me represents a methyl group, $R^1$ represents an alkyl group having 1 to 4 carbon atoms.

According to the present disclosure, an inkjet recording device can be provided which includes a cleaning liquid having an excellent cleaning power for pigmented ink having a high film-forming property and capable of improving discharging reliability after cleaning.

Having now fully described embodiments of the present invention, it will be apparent to one of ordinary skill in the art that many changes and modifications can be made thereto without departing from the spirit and scope of embodiments of the invention as set forth herein.

What is claimed is:

1. An inkjet recording device, comprising:
    an ink;
    a discharging head configured to discharge the ink to a recording medium; and
    a cleaning liquid,
    wherein the ink comprises water, a urethane resin having a glass transition temperature of 0 degrees C. or lower, a pigment, a compound represented by the formula (1), and a surfactant, and
    wherein the cleaning liquid comprises water, a compound represented by the formula (1), a glycol ether compound comprising a dialkylglycol ether compound represented by the formula (2), and a surfactant,

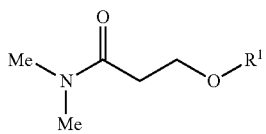

formula (1)

where Me represents a methyl group, and $R^1$ represents an alkyl group having 1 to 4 carbon atoms,

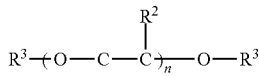

formula (2)

where $R^2$ represents H or $CH_3$, $R^3$ represents $C_mH_{2m+1}$, n represents an integer of from 1 to 3, and m represents an integer of from 1 to 4.

2. The inkjet recording device according to claim 1, further comprising a wiping member configured to wipe off a nozzle surface of the discharging head.

3. The inkjet recording device according to claim 1, wherein the urethane resin comprises a polycarbonate-based urethane resin and has a glass transition temperature of −20 degrees C. or lower.

4. The inkjet recording device according to claim 1, wherein the surfactant in the cleaning liquid comprises a polyoxyalkylene surfactant.

5. A cleaning method, comprising:
recording an image with an ink comprising water, a urethane resin having a glass transition temperature of 0 degrees C. or lower, a pigment, a compound represented by the formula 1), and a surfactant; and
cleaning with a cleaning liquid a nozzle surface of a discharging head configured to discharge the ink, the cleaning liquid comprising water, a compound represented by the formula (1), a glycol ether compound comprising a dialkylglycol ether compound represented by the formula (2), and a surfactant,

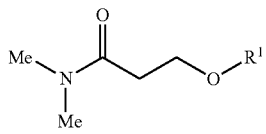

formula (1)

where Me represents a methyl group, and $R^1$ represents an alkyl group having 1 to 4 carbon atoms,

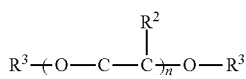

formula (2)

where $R^2$ represents H or $CH_3$, $R^3$ represents $C_mH_{2m+1}$, n represents an integer of from 1 to 3, and m represents an integer of from 1 to 4.

6. The cleaning method according to claim 5, further comprising applying the cleaning liquid to a wiping member and wiping off the nozzle surface with the wiping member to which the cleaning liquid is applied.

7. A set, comprising:
an ink comprising water, a urethane resin having a glass transition temperature of 0 degrees C. or lower, a pigment, a compound represented by the formula (1), and a surfactant; and
a cleaning liquid comprising water, a compound represented by the formula (1), a glycol ether compound comprising a dialkylglycol ether compound represented by the formula (2), and a surfactant,

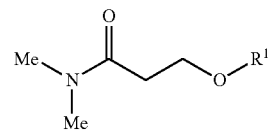

formula (1)

where Me represents a methyl group, and $R^1$ represents an alkyl group having 1 to 4 carbon atoms,

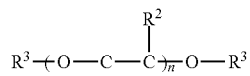

formula (2)

where $R^2$ represents H or $CH_3$, $R^3$ represents $C_mH_{2m+1}$, n represents an integer of from 1 to 3, and m represents an integer of from 1 to 4.

8. The inkjet recording device according to claim 1, wherein the dialkylglycol ether compound is selected from the group consisting of diethyleneglycol dimethylether, dietyleneglycol diethylether, diethyleneglycol dibutylether, tetraethyleneglycol dimethyleter, and tetraethyleneglycol diethylether.

9. The inkjet recording device according to claim 1, wherein the dialkylglycol ether compound is selected from the group consisting of dietyleneglycol di ethyl ether and diethyleneglycol dibutylether.

10. The inkjet recording device according to claim 1, wherein the dialkylglycol ether compound is included in the cleaning liquid in an amount of from 20 to 30% by mass.

11. The inkjet recording device according to claim 1, wherein the glycol ether compound is included in the cleaning liquid in an amount of from 30 to 70% by mass.

* * * * *